(12) United States Patent
Suzuki et al.

(10) Patent No.: US 7,601,793 B2
(45) Date of Patent: Oct. 13, 2009

(54) POLYURETHANE COMPOSITION AND MOLDED ARTICLE THEREOF

(75) Inventors: Shintaro Suzuki, Tokyo (JP); Yuichi Fukunaga, Ichihara (JP); Haruhito Sato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 252 days.

(21) Appl. No.: 10/590,030

(22) PCT Filed: Feb. 9, 2005

(86) PCT No.: PCT/JP2005/001920

§ 371 (c)(1),
(2), (4) Date: Dec. 28, 2006

(87) PCT Pub. No.: WO2005/080504

PCT Pub. Date: Sep. 1, 2005

(65) Prior Publication Data

US 2007/0270537 A1    Nov. 22, 2007

(30) Foreign Application Priority Data

Feb. 20, 2004  (JP) .............................. 2004-043973
Jun. 18, 2004  (JP) .............................. 2004-181161

(51) Int. Cl.
*C08G 18/10* (2006.01)
*C08G 18/67* (2006.01)

(52) U.S. Cl. ...................... 528/75; 528/295.3; 528/306; 528/392; 525/28; 525/32.1

(58) Field of Classification Search ................. 525/130, 525/455; 524/487, 490; 528/75, 295.3, 306, 528/392
See application file for complete search history.

(56) References Cited

U.S. PATENT DOCUMENTS 4,355,130 A * 10/1982 Heinze ...................... 524/491

FOREIGN PATENT DOCUMENTS

| JP | 58 111841 | 7/1983 |
|---|---|---|
| JP | 60 99145 | 6/1985 |
| JP | 2 160890 | 6/1990 |
| JP | 5 502686 | 5/1993 |
| JP | 7 292167 | 11/1995 |
| JP | 2000 160133 | 6/2000 |
| JP | 2002 129007 | 5/2002 |
| JP | 2002 212534 | 7/2002 |
| WO | 02 31044 | 4/2002 |

* cited by examiner

*Primary Examiner*—RAndy Gulakowski
*Assistant Examiner*—Michael Leonard
(74) *Attorney, Agent, or Firm*—Oblon, Spivak, McClelland, Maier & Neustadt, L.L.P.

(57) ABSTRACT

A polyurethane composition containing (A) a urethane compound obtained by reacting 100 parts by weight of a polyol with a polyisocyanate such that the NCO/OH equivalent weight ratio is greater than 0.5 but smaller than 15, and (B) a compound selected from a linear olefin compound having at least 6 carbon atoms, an oligomer of a linear olefin compound having at least 6 carbon atoms or an epoxy compound of an oligomer of a linear olefin compound having at least 6 carbon atoms, wherein the content of said compound (B) per 100 parts by weight of said polyol is greater than 5 parts by weight but smaller than 400 parts by weight. This composition is a composition with no suspicions that it contains an endocrine-disrupting chemical.

22 Claims, No Drawings

POLYURETHANE COMPOSITION AND MOLDED ARTICLE THEREOF

This application is a 371 of PCT/JP05/01920 filed Feb. 9, 2005. This application claims priority to Japan 2004-043973, filed Feb. 20, 2004, and Japan 2004-181161, filed Jun. 18, 2004.

FIELD OF THE INVENTION

The present invention relates to a polyurethane composition and a molded article thereof.

TECHNICAL BACKGROUND

Polyurethane compositions can be diversely adjusted in chemical and physical properties by combining, as required, a polyol, a polyisocyanate, a plasticizer and another additive. They are used in various fields of soft to hard products such as an adhesive, a coating composition, a fiber, a foam, a leather, a molded article, and the like. For polyurethane compositions, phthalic esters have been used as a cheap plasticizer for a long time.

However, with regard to the phthalic esters used as a conventional plasticizer, there are suspicions that they are endocrine-disrupting chemicals, and it is required to place them under stringent control as first-category specified chemical materials under Pollutant Release and Transfer Register Law (PRTR Raw).

It is therefore demanded to develop a cheap and safe plasticizer that replaces such phthalic esters.

For example, there has been-disclosed a polyester-based plasticizer as-a plasticizer that is not any phthalic ester (JP-A-H2-160890). Further, there has been disclosed the use of diacetyl monoacyl glycerol as a plasticizer (JP-A-2002-129007). Further, there has been disclosed the use, as a plasticizer, of a compound obtained by esterification of a polybasic acid and an alcohol having an ether bond (JP-A-2002-212534). However, the compositions containing such plasticizers are poor in workability after prepared.

DISCLOSURE OF THE INVENTION

The present invention has been made in the light of the above problems, and it is an object of the present invention to provide a polyurethane composition with no suspicions that it contains an endocrine-disrupting chemical, and a molded article thereof.

For achieving the above object, the present inventors have made diligent studies. As a result, it has been found that the use, as a plasticizer, of an aliphatic unsaturated hydrocarbon compound having at least one double bond is highly safe and produces a plasticization effect similar to those of conventional phthalic ester plasticizers (such as dioctyl phthalate (DOP)), and the present invention has been accordingly completed.

According to the present invention, the following polyurethane compositions are provided.

1. A polyurethane composition comprising (A) a urethane compound obtained by reacting 100 parts by weight of a polyol with a polyisocyanate such that the NCO/OH equivalent weight ratio is greater than 0.5 but smaller than 15, and (B) a compound selected from a linear olefin compound having at least 6 carbon atoms, an oligomer of a linear olefin compound having at least 6 carbon atoms or an epoxy compound of an oligomer of a linear olefin compound having at least 6 carbon atoms, wherein the content of said compound (B) per 100 parts by weight of said polyol is greater than 5 parts by weight but smaller than 400 parts by weight.

2. A polyurethane composition as recited in 1, wherein the linear olefin compound having at least 6 carbon atoms for said compound (B) is an a-olefin having 6 to 30 carbon atoms.

3. A polyurethane composition as recited in 1, wherein the linear olefin compound having at least 6 carbon atoms for said compound (B) is an a-olefin having 6 to 18 carbon atoms.

4. A polyurethane composition as recited in 1, wherein the linear olefin compound having at least 6 carbon atoms for said compound (B) is a linear inner olefin having 6 to 30 carbon atoms.

5. A polyurethane composition as recited in 1, wherein the oligomer of a linear olefin compound having at least 6 carbon atoms for said compound (B) is an oligomer formed of 2 to 8 molecules of a linear olefin compound having 6 to 30 carbon atoms.

6. A polyurethane composition as recited in 1, wherein the epoxy compound of an oligomer of a linear olefin compound having at least 6 carbon atoms for said compound (B) is an epoxidation product of a dimer of a linear olefin compound having 6 to 30 carbon atoms.

7. A molded article produced by molding the polyurethane composition recited in any one of the above 1 to 6.

According to the present invention, there can be provided a polyurethane composition with no suspicions that it contains an endocrine-disrupting chemical, and a molded article thereof. The composition of the present invention is also excellent in workability after prepared.

PREFERRED EMBODIMENTS OF THE INVENTION

The polyurethane composition of the present invention comprises (A) a urethane compound obtained by reacting 100 parts by weight of a polyol with a polyisocyanate such that the NCO/OH equivalent weight ratio is greater than 0.5 but smaller than 15, and (B) a compound selected from a linear olefin compound having at least 6 carbon atoms, an oligomer of a linear olefin compound having at least 6 carbon atoms or an epoxy compound of an oligomer of a linear olefin compound having at least 6 carbon atoms.

The urethane compound (A) is a polymer obtained by a condensative reaction of a polyol having at least 2 hydroxy groups (OH) with a polyisocyanate having at least 2 isocyanate groups (NCO).

The urethane compound (A) is obtained by reacting 100 parts by weight of a polyol with a polyisocyanate such that the NCO/OH equivalent weight ratio is greater than 0.5 but smaller than 15. When the NCO/OH equivalent weight ratio is 0.5 or less, the reactivity between the polyol and the polyisocyanate is low, and no polyurethane composition can be obtained. When it is 15 or more, the compatibility of the urethane compound (A) with the compound (B) is poor.

In the present invention, when the composition is cured to form a polyurethane cured product, there is used, as a urethane compound (A), a compound obtained by reacting 100 parts by weight of a polyol with a polyisocyanate such that the NCO/OH equivalent weight ratio is preferably greater than 0.5 but not more than 2.0, more preferably 0.9 to 1.2.

When the composition is not cured to be a urethane prepolymer, there is used, as a urethane compound (A), a compound obtained by reacting 100 parts by weight of a polyol with a polyisocyanate such that the NCO/OH equivalent weight ratio is preferably at least 2.0 but less than 15, more preferably from 2.0 to 10, still more preferably from 2.0 to 8.0.

As described above, the urethane compound (A) is produced while controlling the amount of active (reactive with hydroxy group) isocyanate group of a polyisocyanate depending upon purposes.

Preferably, a polyol and a polyurethane are reacted in a nitrogen or dry air current at 70 to 100° C. for several hours.

A urethane prepolymer may be cured to form a polyurethane cured product.

The polyol is not specially limited so long as it is an active-hydrogen-containing compound having two or more hydroxy groups. Generally, a polyether polyol or polyester polyol is preferably used.

More specifically, examples of the polyether polyol include diols such as ethylene glycol, propylene glycol, butylene glycol, etc., triols such as glycerin, trimethylolpropane, etc., and random or block copolymers obtained by ring-opening polymerization of propylene oxide and/or ethylene oxide, etc., in the presence of one or more of ammonia and amines such as ethylenediamine, and the like.

Further, the polyester polyol includes copolymers obtained by polycondensation of adipic acid, sebacic acid, terephthalic acid, etc., in the presence of ethylene glycol, propylene glycol, 1,4-butanediol, neopentyl glycol, or the like.

Further, polyolefin-based polyols such as a polybutadiene-based polyol, polyisoprene-based polyol and hydrogenated products thereof are also preferred.

In addition to the above compounds, there can be used low-molecular-weight active hydrogen compounds having at least two hydroxy groups, such as bisphenol A, a rum ester of castor oil, and the like. As such a compound, generally, there can be preferably used a compound having a molecular weight of 100 to 7,000 and having 2 to 4 hydroxy groups per molecule.

The polyisocyanate is not specially limited so long as it has at least two isocyanate groups.

Specifically, the polyisocyanate includes aromatic polyisocyanate such as diphenyl methane diisocyanate (MDI), tolylene diisocyanate (TDI) and naphthalene diisocyanate, aliphatic polyisocyanates such as hexamethylene diisocyanate (HDI) and lysine methyl ester diisocyanate, and alicyclic polyisocyanates such as hydrogenated diphenyl methane diisocyanate, isophorone diisocyanate, norbornene diisocyanate and hydrogenated tolylene diisocyanate. Of these, it is preferred to use MDI in view of toxicity, a price, and the like.

The compound (B) is selected from aliphatic unsaturated hydrocarbons having one or more double bonds. Specifically, it is selected from a linear olefin compound having at least 6 carbon atoms, an oligomer of a linear olefin compound having at least 6 carbon atoms or an epoxy compound of an oligomer of a linear olefin compound having at least 6 carbon atoms. These compounds may be used singly, or as a mixture of at least two members of these.

The linear olefin compound having at least 6 carbon atoms is preferably an α-olefin having 6 to 30 carbon atoms, more preferably 6 to 18 carbon atoms. Examples thereof include 1-hexene, 1-octene, 1-decene, 1-dodecene, 1-tetradecene, 1-hexadecene, 1-octadecene, etc.

A linear inner olefin having 6 to 30 carbon atoms is also preferred, and a linear inner olefin having 18 to 24 carbon atoms is more preferred. For example, 2-octadecene, 3-octadecene, 4-octadecene, 5-octadecene, 2-eicosene, 3-eicosene, 4-eicosene and 5-eicosene are preferred. The above inner olefin refers to an olefin compound having a double bond in a position other than terminal positions. An inner olefin can be obtained by an isomerizing reaction, etc., of an olefin.

An aliphatic unsaturated hydrocarbon compound having two or more double bonds is preferred since a non-conjugated compound has an excellent stability.

The oligomer of a linear olefin compound having at least 6 carbon atoms is preferably an oligomer formed of 2 to 8 molecules of a linear olefin compound. An oligomer formed of 9 or more molecules of a linear olefin compound is sometimes not suitable as a plasticizer since it has a high viscosity. When plasticization and a volatilization loss are together taken into account, oligomers including a dimer to a tetramer are more preferred.

In this case, the number of carbon atoms constituting a linear olefin forming an oligomer is preferably 6 to 30, more preferably 6 to 18, still more preferably 10 to 15. Examples of the oligomer preferably include 2-butyl-1-octene, 2-hexyl-1-decene, 2-octyl-1-dodecene, 2-decyl-1-tetradecane, 2-dodecyl-1-hexadecane, 2-tetradecyl-1-octadecane, a decene trimer, a decene tetramer, a dodecene trimer, a dodecene tetramer, a tetradecene trimer, a tetradecene tetramer, and the like.

The oligomer (dimer to octamer) of a liner olefin compound can be produced in the presence of an acid catalyst or an organic metal catalyst with a transition metal coordinated.

The epoxy compound of an oligomer of a linear olefin compound having at least 6 carbon atoms can be produced by epoxidizing a linear olefin compound having at least 6 carbon atoms in the presence of an organic peracid such as peracetic acid or perbenzoic acid, a peroxide such as benzoyl peroxide or methyl ethyl ketone peroxide, hydrogen peroxide, or the like.

In the present invention, the above epoxy compound is preferably an epoxidation product of a dimer of a linear olefin compound having 6 to 30 carbon atoms. Specifically, the epoxy compound can be preferably selected from 2-butyl-2-hexyloxirane, 2-hexyl-2-octyloxirane, 2-decyl-2-octyloxirane, 2-decyl-2-dodecyloxirane, 2-dodecyl-2-tetradecyloxirane or 2-hexadecyl-2-tetradecyloxidane.

Further, a polyolefin compound such as a propylene oligomer or a polybutene oligomer can be also used.

The amount of the compound (B) per 100 parts by weight of the polyol is greater than 5 parts by weight but smaller than 400 parts by weight, preferably 10 to 200 parts by weight, more preferably 40 to 150 parts by weight. When the above amount is 5 parts by weight or less, the composition has a high viscosity, and the workability thereof is extremely poor. When it is 400 parts by weight or more, the composition is not cured, and no polyurethane composition is formed.

The composition of the present invention may contain other additives so long as the intended properties are not impaired. Specific examples of the additives include a filler, a thixotropy agent, a cure-promoting catalyst, an adhesion-imparting agent, an antioxidant, a colorant, and the like.

Specific examples of the filler include inorganic fillers having a particle diameter of 1 to 500 μm such as clay, talc, calcium carbonate (bicarbonate, precipitated), calcium oxide, silica sand, a slate sand powder, a mica powder, alumina, a glass powder, zinc flower, titanium dioxide, carbon black, and the like, and inorganic fillers prepared by surface-treating these. Of these, it is preferred to incorporate calcium bicarbonate in view of economics and easy handling. More preferably, calcium bicarbonate prepared by adjusting the moisture content of calcium carbonate to 0.1% or less is preferred. It is still more preferred to incorporate one such calcium bicarbonate or two or more kinds of such calcium bicarbonates having different diameters.

The thixotropy agent specifically includes inorganic thixotropy agents such as a silica powder and an asbestos powder, and organic thixotropy agents such as organic bentonite, a polyvinyl chloride powder and a modified polyester polyol type agent. Of these, a silica powder is preferred which has a high thixotropy-imparting effect even when added in a small amount.

The cure-promoting catalyst includes dibutyl tin dilaurate (DBTDL), lead octylate, etc., and the adhesion-imparting agent includes coupling agents such as isocyanatesilane, glycidylsilane, and the like.

Further, there may be also used a hydrochloric acid absorbing agent, a heat stabilizer, a weathering stabilizer, a light stabilizer, an ultraviolet absorbent, a slip agent, an anti-blocking agent, an anti-fogging agent, a lubricant, an antistatic agent, a flame retardant, a pigment, a dye, a dispersing agent, a copper toxicity inhibitor, a neutralizing agent, a foaming agent, a plasticizer, a gas foam inhibitor, a crosslinking agent, a flowability improving agent such as peroxide, a weld strength improving agent, a natural oil, a synthetic oil, a wax, and the like.

The composition of the present invention can be molded into various molded articles by methods of injection molding, extrusion molding, calender molding, coatings foaming, lamination, spinning, pressing, casting, and the like.

The composition may be dissolved, dispersed or emulsified in water, an organic solvent, a mixture solvent of water and an organic solvent or a mixture of two or more organic solvents to be used as a one-package or two-package type coating composition, adhesion, coating agent, scratch-inhibiting agent, or the like. The resultant solution, dispersion or emulsion may be applied by spraying, brushing, roll-coating, or the like.

EXAMPLES

The present invention will be explained more specifically with reference to Examples hereinafter. Items in Tables were evaluated as follows.

(1) Measurement of hardness of polyurethane cured product: Measured with a durometer type A according to JIS K7215-1986.

(2) Presence or absence of bleed-out: A cured product was placed on a filter paper, and the filter paper was visually observed to determine whether or not a plasticizer was adhered to the filter paper for evaluation of a presence or absence of bleed-out.

(3) Viscosity measurement: A composition containing a prepolymer was measured for a viscosity with a Brookfield viscometer at 25° C.

(4) Compatibility: A composition containing a prepolymer was placed in a bottle charged hermetically with nitrogen, and its appearance was observed for 1 month, for evaluation of compatibility. In this case, a composition showing no phase separation was evaluated as ○ (good), and a composition showing a phase separation was evaluated as X (poor).

(5) NCO/OH equivalent weight ratio: Calculated from an NCO content of a polyisocyanate and an OH content of a polyol.

(6) Stability: Dioctyl phthalate (DOP) was evaluated as X since it is suspected to be an endocrine-disruptor, and a chlorinated paraffin was evaluated as X since it contains a halogen.

Example 1

100 Parts by weight of a hydroxyl-group-terminated liquid polybutadiene having an average molecular weight-of 2,800 and a hydroxyl value of 46.6 (mg-KOH/g) (trade name: Polybd R-45HT, supplied by Idemitsu Kosan Co., Ltd.) was dehydrated, and then 12.6 parts by weight of liquid modified MDI (MDI: 4,4'-diphenylmethane diisocyanate) (trade name: Millionate MTL, supplied by Nippon Polyurethane Industry Co., Ltd.) (NCO/OH equivalent weight ratio=1.05), 50 parts by weight of 1-tetradecene (trade name: Linealene 14, supplied by Idemitsu Kosan Co., Ltd.) as a plasticizer and 0.05 part by weight of a curing catalyst (dibutyl tin dilaurate (DBTDL)) were mixed therewith, to prepare a composition. The composition was pressed with a hot press machine at 120° C. for 1 hour and then cured at 70° C. for 15 hours to give a polyurethane cured product.

Examples 2-6

A cured product was obtained in the same manner as in Example 1 except that the plasticizer was replaced with 1-hexadecene (trade name: Linealene 16, supplied by Idemitsu Kosan Co., Ltd.) in Example 2, with a dimer of 1-hexene (trade name: Alkylene 12, supplied by Idemitsu Kosan Co., Ltd., purity of 95% or more) in Example 3, with a dimer of 1-decene (trade name: Alkylene 20, supplied by Idemitsu Kosan Co., Ltd., purity of 95% or more) in Example 4, with a trimer of 1-decene (trade name: Alkylene 30, supplied by Idemitsu Kosan Co., Ltd., purity of 90 wt % or more) in Example 5, or with a tetramer of 1-decene (trade name: Alkylene 40, supplied by Idemitsu Kosan Co., Ltd., purity of 90 wt % or more) in Example 6.

Comparative Example 1

A cured product was obtained in the same manner as in Example 1 except that the plasticizer was not used.

Comparative Example 2

A cured product was obtained in the same manner as in Example 1 except that the plasticizer was replaced with dioctyl phthalate (DOP) (special grade reagent, supplied by Hiroshima Wako Purechemical Ind., Ltd.).

Comparative Example 3

A cured product was obtained in the same manner as in Example 1 except that the plasticizer was replaced with chlorinated paraffin (trade name: Toyoparax 145, supplied by Tosoh Corporation).

Comparative Example 4

Example 1 was repeated except that the amount of the liquid modified MDI was changed to 6.0 parts by weight (NCO/OH equivalent weight ratio=0.5). In this Comparative Example, no cured product was obtained.

Comparative Example 5

Example 1 was repeated except that the amount of the plasticizer was changed to 400 parts by weight. In this Comparative Example, no cured product was obtained.

Example 7

100 Parts by weight of polypropylene glycol having a molecular weight of 3,000 (trade name: Adeka Polyether G-3000, supplied by Asahi Denka Kogyo K.K.) was dehydrated, and then 15.5 parts by weight of a liquid modified MDI (NCO/OH equivalent weight ratio=1.05), 50 parts by weight of Linealene 14 as a plasticizer and 0.05 part by weight of a curing catalyst (DBTDL) were mixed therewith to prepare a composition. The composition was cured at 70° C. for 24 hours to give a polyurethane cured product.

Examples 8-12

A cured product was obtained in the same manner as in Example 7 except that the plasticizer was replaced with Linealene 16. in Example 8, with Alkylene 12 in Example 9, with Alkylene 20 in Example 10, with Alkylene 30 in Example 11, or with Alkylene 40 in Example 12.

Comparative Example 6

A cured product was obtained in the same manner as in Example 7 except that the plasticizer was not added.

Comparative Example 7

A cured product was obtained in the same manner as in Example 1 except that the plasticizer was replaced with dioctyl phthalate (DOP) (special grade reagent, supplied by Hiroshima Wako Purechemical Ind., Ltd.).

Comparative Example 8

A cured product was obtained in the same manner as in Example 1 except that the plasticizer was replaced with chlorinated paraffin (trade name: Toyoparax 145, supplied by Tosoh Corporation).

Tables 1 and 2 show evaluation results of Examples 1 to 12 and Comparative Examples 1 to 8.

In Tables, the amount of each plasticizer is an amount per 100 parts by weight of a polyol.

TABLE 1

| | | Examples | | | | | | Comparative Examples | | | | |
|---|---|---|---|---|---|---|---|---|---|---|---|---|
| | | 1 | 2 | 3 | 4 | 5 | 6 | 1 | 2 | 3 | 4 | 5 |
| Polyol | | R-45HT | R-45HT | R-45HT | R-45HT | R-45HT | R-45HT | R-45HT | R-45HT | R-45HT | R-45HT | R-45HT |
| Polyisocyanate | | Modified MDI | Modified MDI | Modified MDI | Modified MDI | Modified MDI | Modified MDI | Modified MDI | Modified MDI | Modified MDI | Modified MDI | Modified MDI |
| NCO/OH | | 1.05 | 1.05 | 1.05 | 1.05 | 1.05 | 1.05 | 1.05 | 1.5 | 1.05 | 0.5 | 1.05 |
| Plasticizer | kind | Linealene 14 | Linealene 16 | Alkylene 12 | Alkylene 20 | Alkylene 30 | Alkylene 40 | No | DOP | Chlorinated paraffin | Linealene 14 | Linealene 14 |
| | Amount (part by weight) | 50 | 50 | 50 | 50 | 50 | 50 | 0 | 50 | 50 | 50 | 400 |
| Hardness | | 40 | 32 | 43 | 28 | 25 | 24 | 52 | 33 | 35 | — | — |
| Bleeding | 24 hr | No | No | No | No | No | No | No | No | No | — | — |
| | 1 week | No | No | No | No | No | No | No | No | No | — | — |
| | 4 weeks | No | No | No | No | No | No | No | No | No | — | — |
| Safety | | ○ | ○ | ○ | ○ | ○ | ○ | ○ | X | X | ○ | ○ |

TABLE 2

| | | Examples | | | | | | Comparative Examples | | |
|---|---|---|---|---|---|---|---|---|---|---|
| | | 7 | 8 | 9 | 10 | 11 | 12 | 6 | 7 | 8 |
| Polyol | | G-3000 | G-3000 | G-3000 | G-3000 | G-3000 | G-3000 | G-3000 | G-3000 | G-3000 |
| Polyisocyanate | | Modified MDI | Modified MDI | Modified MDI | Modified MDI | Modified MDI | Modified MDI | Modified MDI | Modified MDI | Modified MDI |
| NCO/OH | | 1.05 | 1.05 | 1.05 | 1.05 | 1.05 | 1.05 | 1.05 | 1.05 | 1.05 |
| Plasticizer | kind | Linealene 14 | Linealene 16 | Alkylene 12 | Alkylene 20 | Alkylene 30 | Alkylene 40 | No | DOP | Chlorinated paraffin |
| | Amount (part by weight) | 50 | 50 | 50 | 50 | 50 | 50 | 0 | 50 | 50 |
| Hardness | | 25 | 21 | 26 | 22 | 20 | 19 | 35 | 22 | 24 |
| Bleeding | 24 hr | No | No | No | No | No | No | No | No | No |
| | 1 week | No | No | No | No | No | No | No | No | No |
| | 4 weeks | No | No | No | No | No | No | No | No | No |
| Safety | | ○ | ○ | ○ | ○ | ○ | ○ | ○ | X | X |

Examples 13-18

In Example 1, 24 parts by weight of 4,4'-diphenylmethane diisocyanate (MDI) (NCO/OH equivalent weight ratio=2.5) was used in place of the liquid modified MDI, 100 parts by weight of a plasticizer shown in Table 3 and a catalyst were added, and the mixture was allowed to react in a nitrogen current at 70° C. for 5 hours, to give a urethane prepolymer.

Examples 19-24

100 Parts by weight of polypropylene glycol having a molecular weight of 3,000 (Adeka Polyether P-3000, supplied by Asahi Denka Kogyo K.K.) was dehydrated, and then 20 parts by weight of MDI (NCO/OH equivalent weight ratio=2.5), 100 parts by weight of a plasticizer shown in Table 3 and a catalyst were added. The mixture was allowed to react in a nitrogen current at 70° C. for 5 hours to give a urethane prepolymer.

Comparative Example 9

A urethane prepolymer was obtained in the same manner as in Example 13 except that the plasticizer was not added.

Comparative Example 10

A urethane prepolymer was obtained in the same manner as in Example 13 except that 145 parts by weight of MDI was used. The thus-obtained prepolymer had poor compatibility with Linealene 14 (urethane prepolymer and Linealene 14 were separated), so that it was not measurable for a viscosity.

Comparative Example 11

A urethane prepolymer was obtained in the same manner as in Example 13 except that the amount of the plasticizer was changed to 5 parts by weight. The thus-obtained prepolymer exhibited a high viscosity to such an extent that it was not measurable with a rotational viscometer.

Comparative Example 12

A urethane prepolymer was obtained in the same manner as in Example 19 except that the plasticizer was not added.

Tables 3 to 4 show evaluation results of Examples 13 to 24 and Comparative Examples 9 to 12.

In Tables, the amount of each plasticizer is an amount per 100 parts by weight of a polyol.

TABLE 3

| | | Examples | | | | | | Comparative Examples | | |
|---|---|---|---|---|---|---|---|---|---|---|
| | | 13 | 14 | 15 | 16 | 17 | 18 | 9 | 10 | 11 |
| Polyol | | R-45HT | R-45HT | R-45HT | R-45HT | R-45HT | R-45HT | R-45HT | R-45HT | R-45HT |
| Polyisocyanate | | MDI | MDI | MDI | MDI | MDI | MDI | MDI | MDI | MDI |
| NCO/OH | | 2.5 | 2.5 | 2.5 | 2.5 | 2.5 | 2.5 | 2.5 | 15 | 2.5 |
| Plasticizer | kind | Linealene 14 | Linealene 16 | Alkylene 12 | Alkylene 20 | Alkylene 30 | Alkylene 40 | No | Linealene 14 | Linealene 14 |
| | Amount (Polymerization amount) | 100 | 100 | 100 | 100 | 100 | 100 | 100 | 100 | 5 |
| Viscosity (Pa·s) | | 80 | 65 | 85 | 60 | 64 | 72 | 200 | Not measurable | Not measurable |
| Compatibility | | ○ | ○ | ○ | ○ | ○ | ○ | — | X | — |

TABLE 4

| | | Examples | | | | | | Comparative Example |
|---|---|---|---|---|---|---|---|---|
| | | 19 | 20 | 21 | 22 | 23 | 24 | 12 |
| Polyol | | P-3000 | P-3000 | P-3000 | P-3000 | P-3000 | P-3000 | P-3000 |
| Polyisocyanate | | MDI | MDI | MDI | MDI | MDI | MDI | MDI |
| NCO/OH | | 2.5 | 2.5 | 2.5 | 2.5 | 2.5 | 2.5 | 2.5 |
| Plasticizer | kind | Linealene 14 | Linealene 16 | Alkylene 12 | Alkylene 20 | Alkylene 30 | Alkylene 40 | No |
| | Amount (Polymerization amount) | 100 | 100 | 100 | 100 | 100 | 100 | 100 |
| Viscosity (Pa·s) | | 40 | 33 | 42 | 27 | 31 | 36 | 90 |
| Compatibility | | ○ | ○ | ○ | ○ | ○ | ○ | — |

Example 25

A cured product was obtained in the same manner as in Example 1 except that the plasticizer was replaced with an epoxidation product of dimer of 1-decene (2-decyl-2-octyloxirane, Alkylene 20 epoxide, supplied by Idemitsu Kosan Co., Ltd.). Table 5 shows composition and evaluation results. The amount of the plasticizer in Table is an amount per 100 parts by weight of a polyol.

TABLE 5

|  |  | Example 25 |
|---|---|---|
|  | Polyol | R-45HT |
|  | Polyisocyanate | Modified MDI |
| Plasticizer | kind | Alkylene 20 epoxide |
|  | Amount (part by weight) | 50 |
|  | Hardness | 29 |
| Bleeding | 24 hr | No |
|  | 1 week | No |
|  | 4 weeks | No |
|  | Safety | ○ |

Example 26

100 Parts by weight of Alkylene 20 was added, as a plasticizer, to 100 parts by weight of a urethane prepolymer (Colonate 4076, supplied by Nippon Polyurethane Industry Co., Ltd.). The thus-obtained composition was evaluated for a viscosity (measurement temperature: 75° C.) and compatibility. Table 6 shows components of the composition and the evaluation results.

The amount of the plasticizer in Table is an amount per 100 parts by weight of a polyol.

TABLE 6

|  | Examples | | | | | | Comparative Examples | | |
|---|---|---|---|---|---|---|---|---|---|
|  | 26 | 27 | 28 | 29 | 30 | 31 | 13 | 14 | 15 |
| Prepolymer | Colonate 4076 | Colonate 4076 | Colonate 4090 | Colonate 4090 | Colonate 4191 | Colonate 4191 | Colonate 4076 | Colonate 4090 | Colonate 4191 |
| Plasticizer kind | Alkylene 20 | Alkylene 20 epoxide | Alkylene 20 | Alkylene 20 epoxide | Alkylene 20 | Alkylene 20 epoxide | — | — | — |
| Amount (Part by weight) | 100 | 100 | 100 | 100 | 100 | 100 | — | — | — |
| Viscosity (mPa·s) (at 75° C.) | 1000 | 1100 | 490 | 500 | 200 | 210 | 3000 | 1100 | 600 |
| Compatibility | ○ | ○ | ○ | ○ | ○ | ○ | — | — | — |

Examples 27-31

Example 26 was repeated-except that components for a composition were changed as shown in Table 6. Table 6 shows the evaluation results.

Both Coronate 4090 and Coronate 4191 (trade names) are urethane prepolymers supplied by Nippon Polyurethane Industry Co., Ltd.

Comparative Examples 13-15

Each of the urethane prepolymers used in Examples 26, 28 and 30 was measured for a kinetic viscosity. Table 6 shows the results.

INDUSTRIAL UTILITY

The polyurethane composition of the present invention can be suitably used in the fields of non-foamed polyurethane. resins, such as an adhesive, a coating composition, a water-proofing agent, a sealant, a heat-insulating material, a low-temperature insulation material, a cosmetic material, a sealing material, a magnetic binder, a cushioning material, leather, a foam, a fiber, and the like. It is particularly preferably used in the fields of an adhesive, a coating composition, a water-proofing agent and a sealant.

The invention claimed is:

1. A polyurethane composition comprising
   (A) a urethane compound prepared by reacting 100 parts by weight of a polyol with a polyisocyanate such that the NCO/OH equivalent weight ratio is greater than 0.5 but less than 15, and
   (B) a dimer of a linear olefin compound having 6 to 30 carbon atoms,
   wherein the content of said compound (B) per 100 parts by weight of said polyol is greater than 5 parts by weight but less than 400 parts by weight.

2. The polyurethane composition of claim 1, wherein the dimer (B) is a dimer of a linear olefin compound having 10 to 15 carbon atoms.

3. The polyurethane composition of claim 1, wherein the dimer is 2-butyl-1-octene, 2-hexyl-1-decene, 2-octyl-1-dodecene, 2-decyl-1-tetradecane, 2-dodecyl-1-hexadecane, or 2-tetradecyl-1-octadecane.

4. A molded article prepared by molding the polyurethane composition of claim 1.

5. The polyurethane composition of claim 1, wherein the dimer is 2-butyl--1-octene.

6. The polyurethane composition of claim 1, wherein the dimer is 2-hexyl-1-decene.

7. The polyurethane composition of claim 1, wherein the dimer is 2-octyl-1-dodecene.

8. The polyurethane composition of claim 1, wherein the dimer is 2-decyl-1-tetradecane.

9. The polyurethane composition of claim 1, wherein the dimer is 2-dodecyl-1-hexadecane.

10. The polyurethane composition of claim 1, wherein the dimer is 2-tetradecyl-1-octadecane.

11. The polyurethane composition of claim 1, wherein the dimer is a dimer of 1-decene.

12. The polyurethane composition of claim 1, wherein the dimer is a dimer of 1-hexene.

13. The polyurethane composition of claim 1, wherein the content of said compound (B) per 100 parts by weight of said polyol is 10 to 200 parts by weight.

14. The polyurethane composition of claim 1, wherein the content of said compound (B) per 100 parts by weight of said polyol is 40 to 150 parts by weight.

15. The polyurethane composition of claim 1, wherein the NCO/OH equivalent weight ratio is greater than 0.5 but less than 2.

16. The polyurethane composition of claim 1, wherein the NCO/OH equivalent weight ratio is 0.9-1.2.

17. The polyurethane composition of claim 1, wherein the NCO/OH equivalent weight ratio is 2-10.

18. The polyurethane composition of claim 1, wherein the NCO/OH equivalent weight ratio is 2-8.

19. The polyurethane composition of claim 1, consisting essentially of said urethane compound and said dimer.

20. The polyurethane composition of claim 1, said composition being free of phthalic ester plasticizer.

21. The polyurethane composition of claim 14, wherein the NCO/OH equivalent weight ratio is 0.9-1.2.

22. The polyurethane composition of claim 14, wherein the NCO/OH equivalent weight ratio is 2-8.

* * * * *